United States Patent
Chang et al.

(10) Patent No.: US 12,242,313 B1
(45) Date of Patent: Mar. 4, 2025

(54) STATE MACHINE-COUPLED SENSOR CONTROL

(71) Applicant: DELL PRODUCTS L.P., Round Rock, TX (US)

(72) Inventors: Chen Hsin Chang, Keelung (TW); Wan Shih Chien, New Taipei (TW); Yi Min Lin, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/477,257

(22) Filed: Sep. 28, 2023

(51) Int. Cl.
G06F 1/16 (2006.01)

(52) U.S. Cl.
CPC .......... *G06F 1/1694* (2013.01); *G06F 1/1677* (2013.01)

(58) Field of Classification Search
CPC ............................ G06F 1/1694; G06F 1/1677
See application file for complete search history.

(56) References Cited

U.S. PATENT DOCUMENTS

| | | | |
|---|---|---|---|
| 11,669,639 B2 | 6/2023 | Iyer et al. | |
| 2012/0072167 A1* | 3/2012 | Cretella, Jr. | G06F 9/00 702/150 |
| 2016/0182132 A1 | 6/2016 | Pelissier et al. | |
| 2018/0271432 A1* | 9/2018 | Auchinleck | A61B 5/1071 |
| 2021/0311527 A1* | 10/2021 | Sumikawa | G06F 1/3212 |
| 2022/0231532 A1 | 7/2022 | Sultenfuss et al. | |
| 2022/0350373 A1* | 11/2022 | Cui | G06F 1/1677 |

* cited by examiner

*Primary Examiner* — Lixi C Simpson
(74) *Attorney, Agent, or Firm* — Larson Newman, LLP (57) ABSTRACT

A system determines a current state of an information handling system, and receives a sensor output signal. The system determines whether a status change of the sensor output signal relates to an expected state based on the current state and a previous state of the information handling system, and determines whether the sensor output signal is triggered by an external magnet. If the status change of the sensor output signal relates to the expected state and the sensor output signal is not triggered by the external magnet, then the system transitions the information handling system from the current state to the expected state.

20 Claims, 6 Drawing Sheets

300

| | | Condition 1 | Condition 2 | Condition 3 | Condition 4 | Condition 5 | Condition 6 | Condition 7 | Condition 8 |
|---|---|---|---|---|---|---|---|---|---|
| | Hinge Angle | | 360 | 0 | | | | >0, <180 | >180, <360 |
| Signal | Lid Position Sensor 230 | 0 | 0 | 0 | 0 | 1 | 1 | 1 | 1 |
| | Mode Sensor 235 | 0 | 0 | 1 | 1 | 0 | 0 | 1 | 1 |
| | Orientation Sensor 215 | 0 | 1 | 0 | 1 | 0 | 1 | 0 | 1 |
| Status | Notebook/Tablet Mode | Tablet | Tablet | Notebook | Tablet | Notebook | Tablet | Notebook | Tablet |

| Current State 510 | Previous State 505 | Next State 515 |
|---|---|---|
| Condition 3 | Condition 7 | Condition 7 |
| | Condition 3 | Condition 8 |
| Condition 7 | Condition 3 | Condition 3 |
| | Condition 8 | Condition 8 |
| Condition 8 | Condition 8 | Condition 3 |
| | Condition 7 | Condition 2 |
| | Condition 7 | Condition 7 |
| Condition 2 | Condition 2 | Condition 2 |
| | Condition 2 | Condition 7 |
| | Condition 8 | Condition 8 |

FIG. 7

STATE MACHINE-COUPLED SENSOR CONTROL

FIELD OF THE DISCLOSURE

The present disclosure generally relates to information handling systems, and more particularly relates to state machine-coupled sensor control.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system determines a current state of an information handling system, and receives a sensor output signal. The system determines whether a status change of the sensor output signal relates to an expected state based on the current state and a previous state of the information handling system, and determines whether the sensor output signal is triggered by an external magnet. If the status change of the sensor output signal relates to the expected state and the sensor output signal is not triggered by the external magnet, then the system transitions the information handling system from the current state to the expected state. The expected state is a predefined state sequence associate with a system mode.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
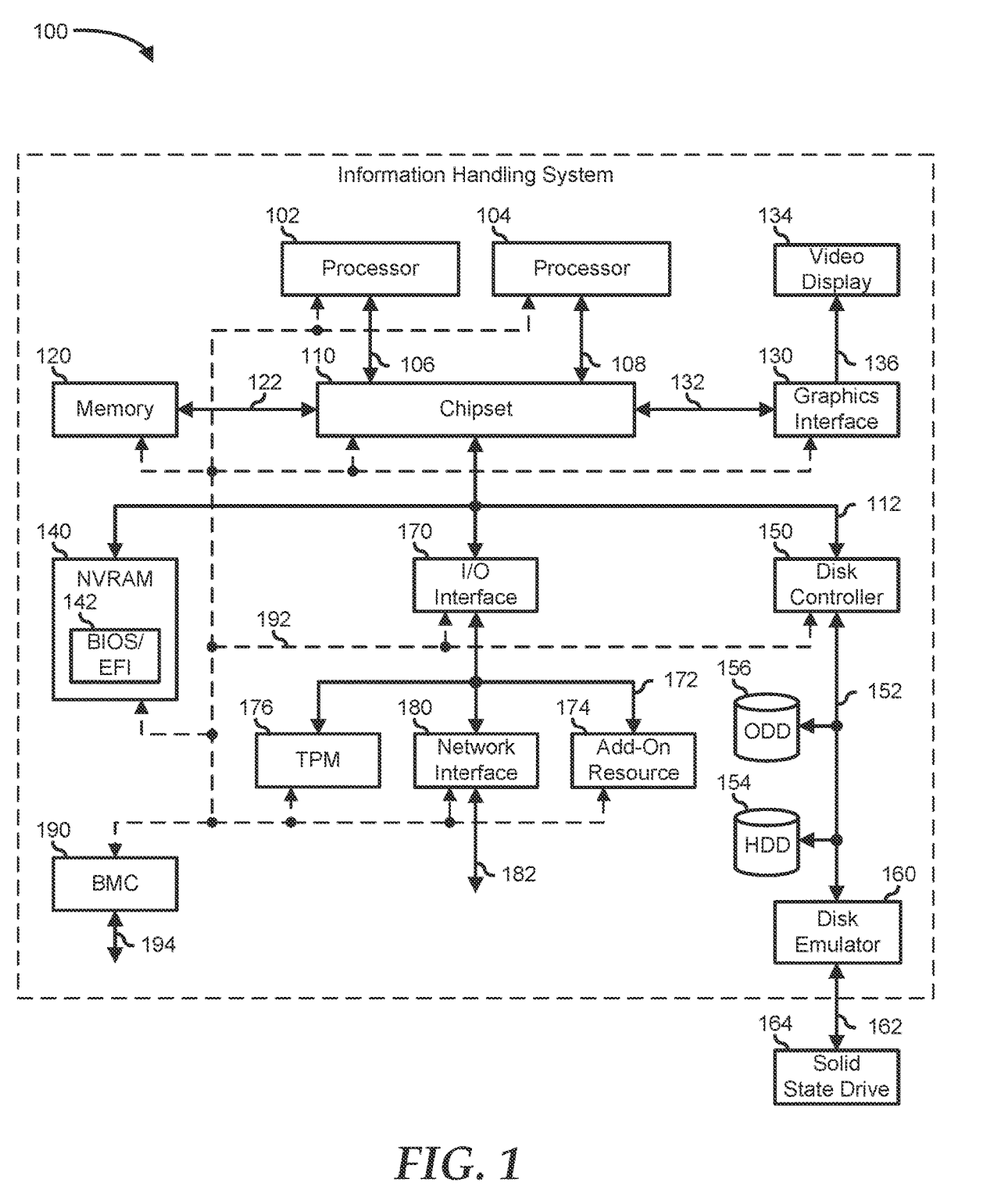
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface, a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include a $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a RedfishR interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

2-in-1 information handling systems may suffer issues such as excessive heat when taken out of storage and an incorrect screen orientation when resuming from a standby mode, such as Windows® modern standby mode. These issues may develop due to a transition in a sensor state and/or a system mode. Typically, a 2-in-1 system includes three general-purpose input/output (GPIO) pins to determine eight sensor conditions. The eight sensor conditions are example. There can be more or less number of sensor conditions based on a system or sensor design. Each change in a GPIO pin state can trigger the transition in a sensor condition and/or a system mode. If one of the GPIOs unexpectedly changes the pin state, such as due to an external magnet in its vicinity, then the sensor state and/or the system mode may be changed to an unexpected state, typically referred to as falsely triggering the sensor state and/or system mode.

The present inventors have recognized that when a 2-in-1 system is proximate to an external magnet, which can be a part of various devices such as a smartphone or a tablet, the external magnet can have a repulsive effect with magnets in the 2-in-1 system. This repulsive effect may reduce magnetic flux that can cause a change to a sensor signal state even when the information handling system's lid is closed. The change to the sensor signal state may cause the information handling system to unexpectedly enter a wrong system mode, which can cause the issues mentioned above. To address these and other concerns, the present disclosure provides a sequential state machine sensor control.

Figure 2:
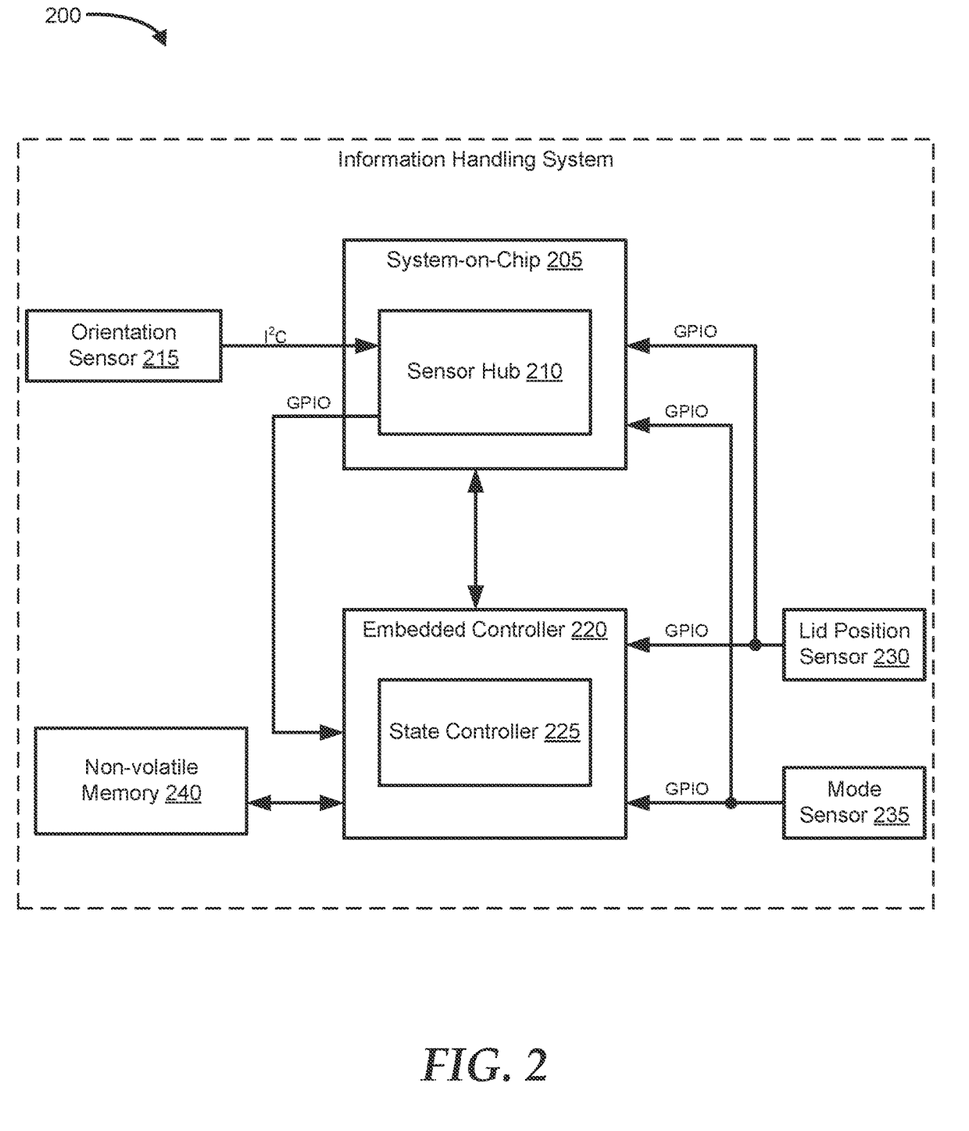
FIG. 2 is a block diagram of an information handling system for state machine-coupled sensor control, according to an embodiment of the present disclosure.

FIG. 2 shows a diagram of an information handling system 200 for state machine-coupled sensor control. Information handling system 200 includes a system-on-chip 205, an orientation sensor 215, an embedded controller 220, a lid position sensor 230, a mode sensor 235, and a non-volatile memory 240. System-on-chip 205 includes a sensor hub 210 while embedded controller 220 includes a state controller 225. The components of information handling system 200 may be implemented in hardware, software, firmware, or any combination thereof. The components shown are not drawn to scale and information handling system 200 may include additional or fewer components. In addition, connections between components may be omitted for descriptive clarity.

Figure 3:
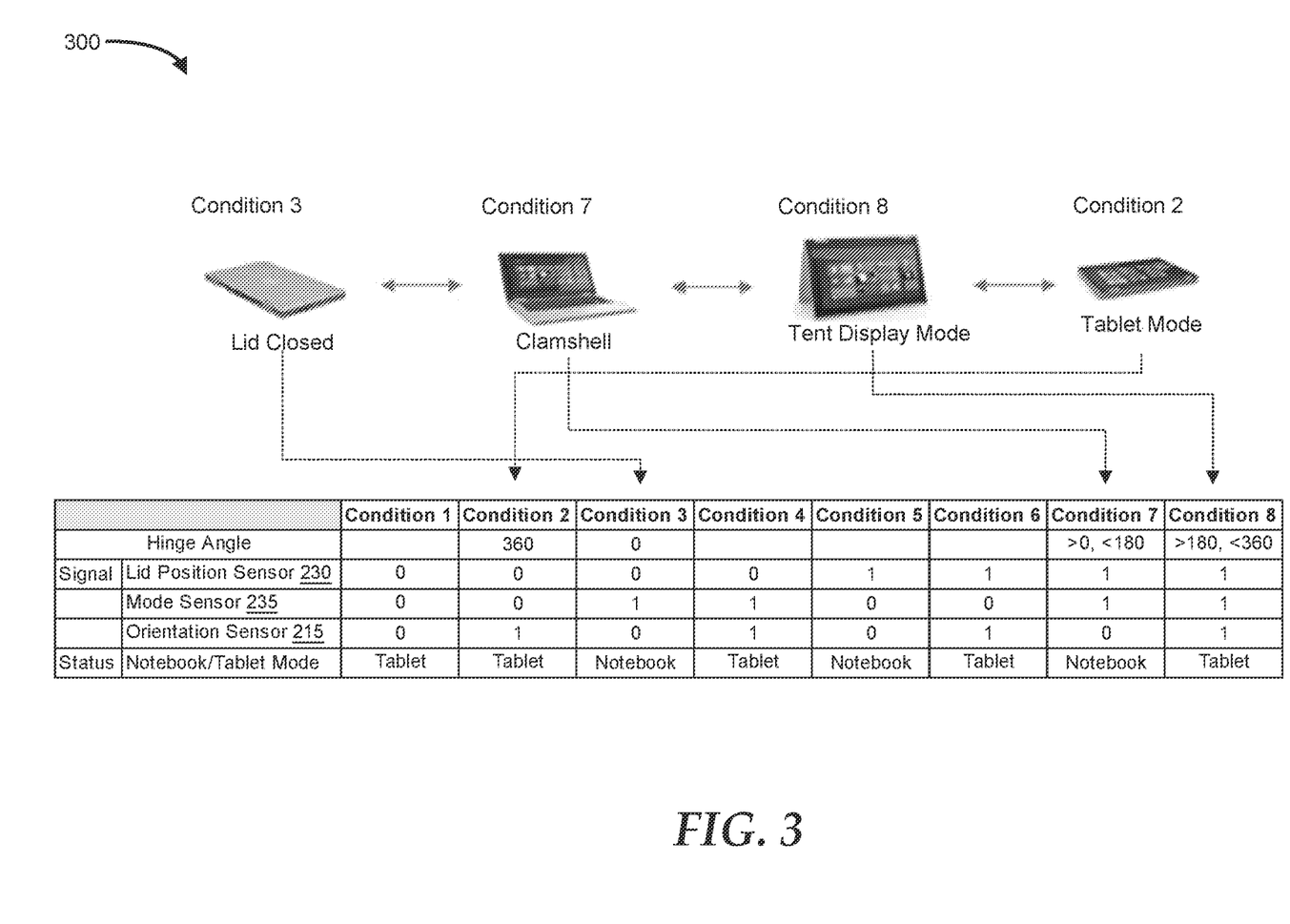
FIG. 3 is a table that includes characteristics of conditions associated with an information handling system, according to an embodiment of the present disclosure.

Information handling system 200 may be a 2-in-1 information handling system that includes a lid mechanically coupled to a base via one or more hinges. Typically, the lid includes a display screen while the base includes a keyboard. Information handling system 200, which is similar to information handling system 100 of FIG. 1, can be configured in various arrangements that each provide a user with different capabilities. For example, as illustrated in FIG. 3, the lid may be rotated into various positions relative to the base. In certain embodiments, the base houses one or more hardware components of information handling system 200, such as a motherboard, processor(s), storage drives, memory, system-on-chip 205, orientation sensor 215, lid position sensor 230, mode sensor 235, and embedded controller 220 among others.

Sensor hub 210 may be a component of integrated system-on-chip 205 which can be incorporated into a processor, such as processor 102 and processor 104 of information handling system 100 of FIG. 1. Sensor hub 210 may utilize various sensors, such as orientation sensor 215, lid position sensor 230, and mode sensor 235 to determine a current condition or system mode of information handling system 200. In certain embodiments, sensor hub 210 may be an independent microcontroller or another logic unit that is coupled to a motherboard of information handling system 200.

Sensor hub 210 may be configured to detect a signal from orientation sensor 215, lid position sensor 230, and mode sensor 235. Sensor hub 210 may be configured to determine a mode or a condition of information handling system 200 and notify embedded controller 220 of such. Sensor hub 210 may communicate with embedded controller 220, orientation sensor 215, lid position sensor 230, and mode sensor 235 via a bus connection, such as an I$^2$C interface, an Improved Inter-Integrated Circuit (I$^3$C) interface, an SPI bus, a USB interface, or other suitable type of interface or bus. Sensor hub 210 may collect and process data from orientation sensor 215, lid position sensor 230, and mode sensor 235 using data fusion techniques in order to determine contextual information regarding the state or condition of information handling system 200.

In certain embodiments, the mode of information handling system 200 may be determined based on a hinge angle, which is the angle between the lid and the base. For example, a first range of angles of rotation from a closed position may indicate a laptop configuration, a second range of angles may indicate a notebook configuration, and a third range of angles may indicate a tablet configuration. Sensor hub 210 may also additionally utilize orientation and movement information to determine the mode in which information handling system 200 is physically configured. For instance, sensor hub 210 may determine whether information handling system 200 is in a tent display mode based on the hinge angle and its orientation. Sensor hub 210 may also determine that information handling system 200 is in a tablet mode when information handling system 200 is opened and it lies on a flat surface with the display facing upwards.

Embedded controller 220 may be a motherboard component of information handling system 200, such as BMC 190 of FIG. 1, and may include one or more logic units, such as state controller 225. Firmware instructions utilized by embedded controller 220 may be used to operate a secure execution environment that may include operations for providing various core functions of information handling system 200, such as power management, and management of operating modes of information handling system 200. In addition, embedded controller 220 may be configured to support certain integrated I/O functions. For example, embedded controller 220 may be configured to determine and support a mode of information handling system 200 based on its current state or condition.

State controller 225 may be configured to determine a next state of information handling system 200 based on a current state and a previous state of information handling system 200. State controller 225 may be configured to monitor, manage, and/or control the various states or conditions of information handling system 200. Accordingly, state controller 225 may be configured to determine the current state and previous state of information handling system 200. State controller 225 may store data, such as the current state, previous state, and next state of information handling system 200 in non-volatile memory 240 such as an NV-RAM, a storage device, etc. In addition, state controller 225 may also store the output signals received from lid position sensor 230, mode sensor 235, and sensor hub 210. Although state controller 225 is shown to be included in embedded controller 220, functionality of state controller 225 may be included in other microcontrollers capable of sending system mode information by detecting signals from orientation sensor 215, lid position sensor 230, and mode sensor 235. For example, state controller 225 or its functionality may be incorporated in system-on-chip 205 or sensor hub 210.

Lid position sensor 230 may be configured to report whether the lid of information handling system 200 is in a closed or an open position. Lid position sensor 230 may detect a relative position of a magnet in the base to the lid to determine the position of the lid relative to the base. In one example, lid position sensor 230 can transmit a digital output signal, such as a high or a low signal. For example, lid position sensor 230 may transmit a high signal when it detects that the lid of information handling system 200 is closed and a low signal otherwise via a GPIO pin. An angle of the hinge that is used to mechanically couple the lid and the base would be zero degrees when the lid is in a closed position. In one example, lid position sensor 230 may be a hall sensor or other suitable sensors. When embedded controller 220 receives the signal from lid position sensor 230, embedded controller 220 may transmit a notification to sensor hub 210 to ensure that embedded controller 220 and sensor hub 210 are synchronized.

Mode sensor 235 may be configured to report whether information handling system 200 is in the tablet mode, also referred to as 360-degree mode because in this mode, the hinge angle is at 360 degrees. For example, mode sensor 235 may transmit a high signal when it detects that information handling system 200 is in the tablet mode and a low signal when it detects otherwise via a GPIO pin. In one example, mode sensor 235 may be a giant magnetoresistance (GMR) sensor or other suitable sensors. When embedded controller 220 receives the signal from mode sensor 235, embedded controller 220 may also transmit a notification to sensor hub 210 to ensure that embedded controller 220 and sensor hub 210 are synchronized.

Orientation sensor 215 may be configured to report on a current orientation of information handling system 200. For example, orientation sensor 215 may transmit a high signal when it detects that information handling system 200 is in a notebook mode and a low signal to sensor hub 210 via an I²C interface. Sensor hub 210 may in turn transmit the signal to embedded controller 220 via a GPIO pin. In addition to the signal, sensor hub 210 may also transmit other data, such as accelerometer data that includes angle and orientation to embedded controller 20 via the GPIO pin. Orientation sensor 215 may transmit a notification to a display driver rather than to embedded controller 220 when information handling system 200 is in a different mode, such as a landscape or a portrait mode. In one example, orientation sensor 215 may be an accelerometer, also referred to as a G-sensor or other suitable sensors.

Those of ordinary skill in the art will appreciate that the configuration, hardware, and/or software components of information handling system 200 depicted in FIG. 2 may vary. For example, the illustrative components within information handling system 200 are not intended to be exhaustive but rather are representative to highlight components that can be utilized to implement aspects of the present disclosure. For example, other devices and/or components may be used in addition to or in place of the devices/components depicted. In particular, although the example shows GPIO pins transmitting the output signals from sensor hub 210, lid position sensor 230, and mode sensor 235 to embedded controller 220 and/or state controller 225, other suitable communication buses or interfaces may be used instead, such as an I²C bus, and I³C bus, SPI bus, or similar. The depicted example does not convey or imply any architectural or other limitations with respect to the presently described embodiments and/or the general disclosure. In the discussion of the figures, reference may also be made to components illustrated in other figures for continuity of the description.

FIG. 3 shows a table 300 which includes characteristics of conditions associated with information handling system 200 of FIG. 2. Conditions 3, 7, 8, and 2 may be regarded as valid conditions of information handling system 200. Conditions 1, 4, 5, and 6 may be regarded as invalid conditions or unexpected states of information handling system 200. These invalid conditions or unexpected states may be filtered out, such that information handling system 200 may not transition into these invalid conditions or unexpected states. Information handling system 200 is at condition 3 when its lid is closed. Information handling system 200 is at condition 7 when it is in a clamshell mode. Information handling system 200 is at a condition 8 when it is in a tent display mode. Information handling system 200 is at a condition 2 when it is in the tablet mode. Table 300 shows the signal status of lid position sensor 230, mode sensor 235, and orientation sensor 215 for each condition. A value of one indicates a high signal and a value of zero indicates a low signal. Table 300 also shows the associated hinge angles and system modes. Table 300 may be stored in a non-volatile memory similar to non-volatile memory of FIG. 2.

A state of information handling system 200 may be at a condition 1 when output signals of lid position sensor 230, mode sensor 235, and orientation sensor 215 are each at a low signal and information handling system 200 is in the tablet mode. Information handling system 200 is at the condition 2 when the hinge angle is at 360 degrees, the output signals of lid position sensor 230 and mode sensor 235 are low and the output signal of orientation sensor 215 is high and information handling system 200 is at the tablet mode. Information handling system 200 is in the condition 3 when the hinge angle is zero degrees and the output signals of lid position sensor 230 and orientation sensor 215 are low and the output signal of mode sensor 235 is high. In addition, information handling system 200 is in notebook mode.

Information handling system 200 is at a condition 4, when the output signal of lid position sensor 230 is low while output signals of orientation sensor 215 and mode sensor 235 are high and information handling system 200 is at the tablet mode. Information handling system 200 is at a condition 5 when the output signal of lid position sensor 230 is high while the output signals of orientation sensor 215 and mode sensor 235 are low and information handling system 200 is at the notebook mode.

Information handling system 200 is at a condition 6 when the output signal of lid position sensor 230 and orientation sensor 215 are high while the output signal of mode sensor 235 is low and information handling system 200 is in the tablet mode. Information handling system 200 is at the condition 6 when the output signals of lid position sensor 230 and orientation sensor 215 are high while the output signal of mode sensor 235 is low. In addition, information handling system 200 is in the tablet mode. Information handling system 200 is at the condition 7 when the output signal of lid position sensor 230 and mode sensor 235 is high while the output signal of orientation sensor 215 is low and information handling system is in the notebook mode. In addition, the hinge angle of information handling is greater than zero degrees and less than 180 degrees. Information handling system 200 is at the condition 8 when the output signal of lid position sensor 230, mode sensor 235, and orientation sensor 215 is high. In addition, the hinge angle is greater than 180 degrees and less than 360 degrees. Further, information handling system 200 is in the tablet mode.

Figure 4:
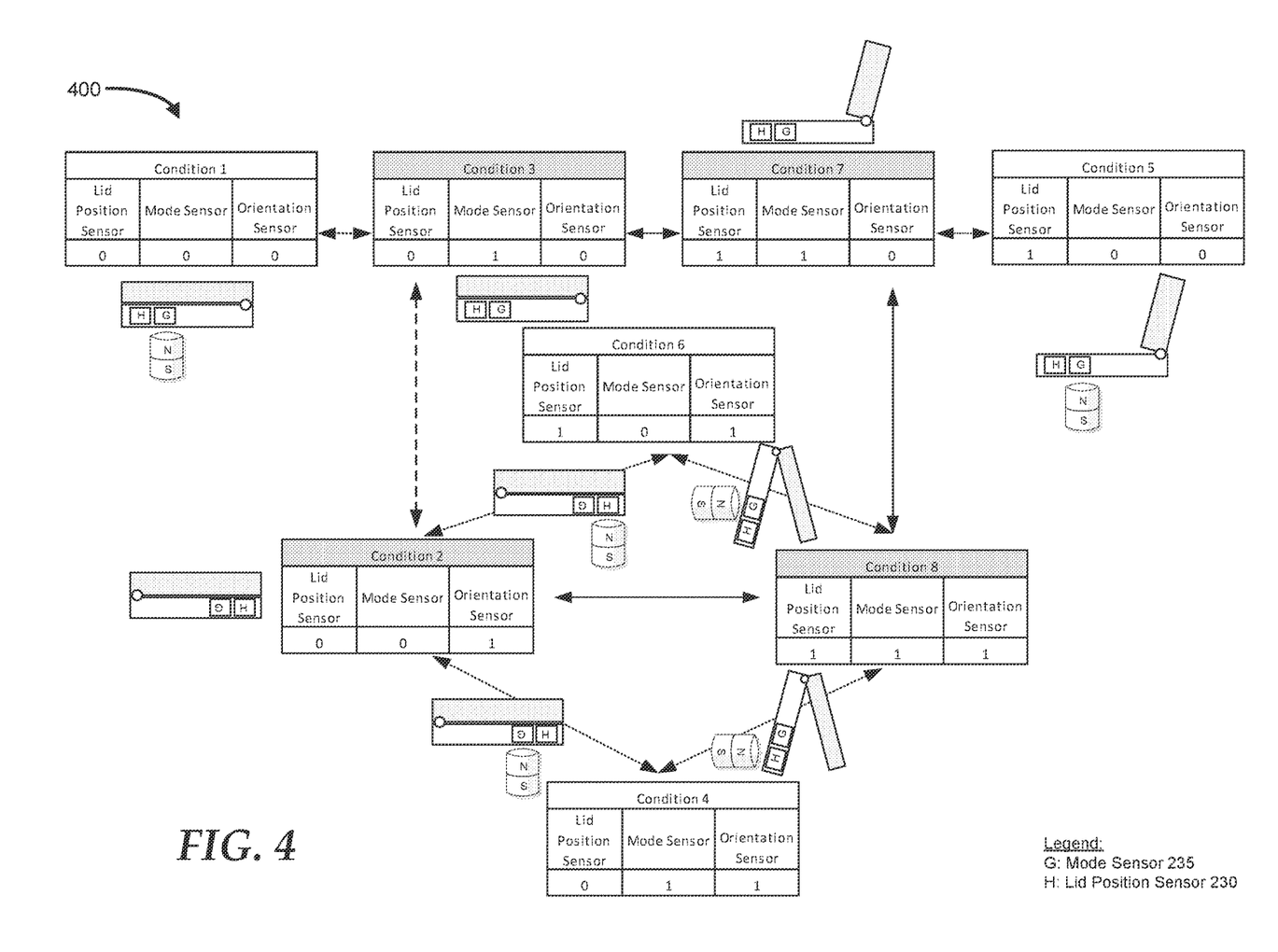
FIG. 4 is a diagram of state machine flow for state machine-coupled sensor control, according to an embodiment of the present disclosure.

FIG. 4 shows a state machine flow 400 for state machine-coupled sensor control. State machine flow 400 includes possible transition among several conditions of information handling system 200, such as conditions 1 through 7. Conditions 2, 3, 7, and 8 depict valid conditions of information handling system 200. Conditions 1, 4, 5, and 6 depict invalid conditions of information handling system 200. For example, the invalid states may be attained when two magnets with like poles face each other which reduces a magnetic flux and affects lid position sensor 230 and/or mode sensor 235, such that its output signal may be changed from high to low or low to high. Thus, falsely triggering the invalid conditions. This can happen when an external magnet is in proximity to the magnets in an information handling system. For example, when the external magnet is in proximity to mode sensor 235 of information handling system 200 in a closed position, the output signal of mode sensor 235 may change from high to low resulting in the condition 1.

Transition to or from an invalid condition may be prevented by a state controller similar to state controller 225 of FIG. 2. Accordingly, the state controller may allow the transition to or from a valid condition. A state transition that deviates from an expected or valid condition may be considered an erroneous transition. In other words, the state controller may transition to a condition when the condition is an expected state and the output signal from one or more sensors is not falsely triggered by the external magnet. So, the state controller may not transition to a condition when the condition is not an expected state and the output signal from one or more sensors is falsely triggered by the external magnet.

In this example, a transition between two conditions is depicted using a line with arrows. A continuous line between two conditions depicts a transition between two valid conditions of information handling system 200. For example, information handling system 200 can transition from the condition 3 to the condition 7 and vice versa. Information handling system 200 can also transition the condition 7 to the condition 8 and vice versa. In addition, information handling system 200 can transition from the condition 8 to the condition 2 and vice versa. For example, at the condition 3, wherein the lid of information handling system 200 is in a closed position of the condition 3, a user can open the lid of information handling system 200 and put it in a clamshell mode of the condition 7. Afterwards, the user can flip the lid of information handling system 200, such that it is in the tent display mode of the condition 8. From the tent display mode, the user can further flip the lid of information handling system 200 and put it in the tablet mode of the condition 2.

A dashed line between two conditions depicts an illegal transition between two conditions. For example, information handling system 200 may not transition from the condition 3 to the condition 1 or vice versa. Information handling system 200 may also not transition from the condition 3 to the condition 2 or vice versa within a threshold period. If the transition from the condition 3 to the condition 2 or vice versa exceeds the threshold period, then the transition is legal. The threshold period may be configurable, such as in hundreds of milliseconds.

Further, information handling system 200 may not transition from the condition 2 to the condition 6 or vice versa. Information handling system 200 may not also transition from the condition 6 to the condition 8 or vice versa. In addition, information handling system 200 may not transition from the condition 8 to the condition 4 or vice versa. Further, information handling system 200 may not transition from the condition 4 to the condition 2 or vice versa.

Information handling system 200 in the condition 3 can transition to the condition 1 when an external magnet is in the proximity of mode sensor 235. In this example, the output signal of mode sensor 235 was changed from high to low. However, because this transition may be considered an erroneous transition, the transition may be prevented by state controller 225 from occurring, and information handling system 200 may remain in the condition 3. Information handling system 200 may transition from the condition 3 to the condition 7 and vice versa.

Information handling system 200 in the condition 3 may not be transitioned to the condition 2 or vice versa within a short period, such as in hundreds of milliseconds. However, if the transition between the condition 3 to the condition 2 or vice versa is longer than the specified short period, then the transition may be valid. For example, it can be assumed that a user may not be able to open the lid of information handling system 200 from a closed position and flip the lid into the tablet mode in hundreds of milliseconds. The user can perform such actions which typically takes the user several seconds or longer.

When information handling system 200 is in the condition 2 and an external magnet is in the proximity to lid position sensor 230, information handling system 200 can transition to the condition 6. However, because this transition may be considered an erroneous transition, the transition may be prevented by state controller 225 from occurring. Thus, information handling system 200 may remain in the condition 2. However, information handling system 200 can transition to the condition 8 from the condition 2 and vice versa. In addition, information handling system 200 may not transition from the condition 2 to the condition 4 and vice versa, which may also be considered an erroneous transition.

In addition, information handling system 200 in the condition 4 may not transition to the condition 8 and vice versa, as this may also be considered as an erroneous transition. Similarly, information handling system 200 in the condition 8 may not transition to the condition 6. However, information handling system 200 in the condition 8 may transition to the condition 7 and vice versa. Information handling system 200 in the condition 7 may transition to the condition 5 and vice versa.

Figure 5:
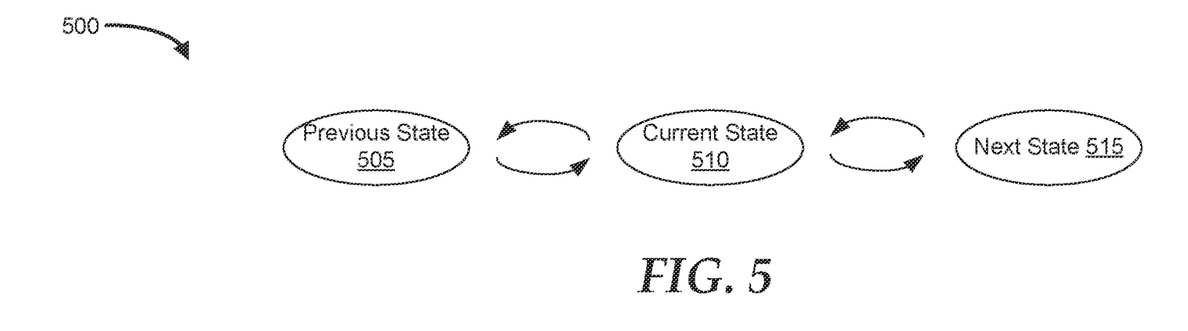
FIG. 5 is a state diagram for state machine-coupled sensor control, according to an embodiment of the present disclosure.

FIG. 5 shows a state diagram 500 for a state machine-coupled sensor control. This provides a system-defined state machine and an order of system orientation with temporal dependencies. State controller 225 in information handling system 200 of FIG. 2 may be configured to record a previous state and a current state of information handling system 200 to determine possible next states as depicted in state diagram 500 and a table 600 of FIG. 6. In this example, state diagram 500 includes a previous state 505, a current state 510, and the next state.

State diagram 500 defines a sequential state and order of state orientation that may ensure accurate mode transitions with temporal dependencies. Further, state diagram 500 may record a previous state and the current state of an information handling system to determine a possible next state. This allows the system to evaluate whether it is performing expected actions and prevents the system from falsely triggering unexpected actions. This may be performed while all sensors can be enabled in all the states. This is in contrast with a conventional workaround of disabling one or more sensors to address the false triggering of unexpected actions.

Transitions between states may be limited between current, previous, and next states, wherein the states are valid conditions. For example, current state 510 may transition to previous state 505 and next state 515. Accordingly, previous state 505 may transition to current state 510. In addition, next state 515 may transition to current state 510. However, previous state 505 may not transition to next state 515. Accordingly, next state 515 may not transition to previous state 505. In addition, there may be limitations, such that a state may not transition to states of conditions that may have been falsely triggered, such as conditions 1, 4, 5, and 6.

Figure 6:
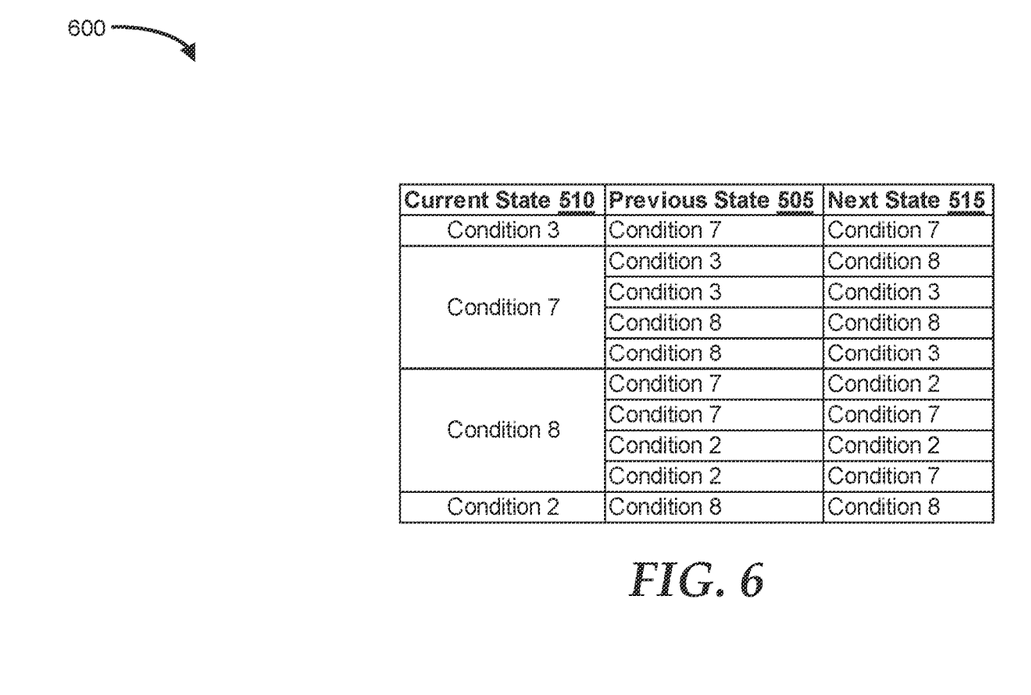
FIG. 6 is a table that shows conditions that a state of an information handling system may transition into, according to an embodiment of the present disclosure.

FIG. 6 shows table 600 which shows conditions that a state of information handling system 200 may transition into. In particular table 600 may show a mapping of conditions in a current state to a previous state and a next state, conditions in the next state are expected states that the current state can transition into. Otherwise, the state may be an unexpected state. Information handling system 200 can transition to the next state or a previous state, if the next state or the previous state is an expected state, as indicated by table 600.

In this example, if information handling system 200 is at the current state 510 which is the condition 3, then information handling system 200 can transition to the condition 7 for next state 515 or back to the condition 7 for previous state 505. Information handling system 200 may not transition to a condition outside of the indicated mapping. For example, information handling system 200 may not transition to condition 1, condition 2, condition 4, condition 5, condition 6, and condition 8 if current state 510 is in condition 3 and previous state 505 is in condition 7. Similar limitations may apply to other current states of information handling system 205. For example, if current state 510 of information handling system 200 is the condition 7 and its previous state is the condition 3, then information handling system 200 can transition to the condition 3 or the condition 8 for its next state. Information handling system 200 may not transition to other conditions outside of the mapping. If current state 510 of information handling system 200 is the condition 7 and its previous state 505 is the condition 8, then information handling system 200 can transition to the condition 8 or the condition 3 for its next state 515.

If current state 510 of information handling system 200 is the condition 8 and its previous state 505 is the condition 7, then information handling system 200 can transition to the condition 7 or the condition 2 for its next state 515. If current state 510 of information handling system 200 is the condition 8 and its previous state 505 is the condition 2, then information handling system 200 can transition to the condition 7 or the condition 2 for its next state 515. If current state 510 of information handling system 200 is the condition 2 and its previous state 505 is the condition 8, then information handling system 200 can transition to the condition 8 for its next state 515. Although there are eight conditions identified in this example, one of skill in the art will appreciate that there may be more or less conditions associated with the information handling system. Table 600, also referred to as a transition table, explains a typical example, which can be extended to advanced applications or services in practice. Table 600 may be stored in a non-volatile memory similar to non-volatile memory of FIG. 2.

Figure 7:
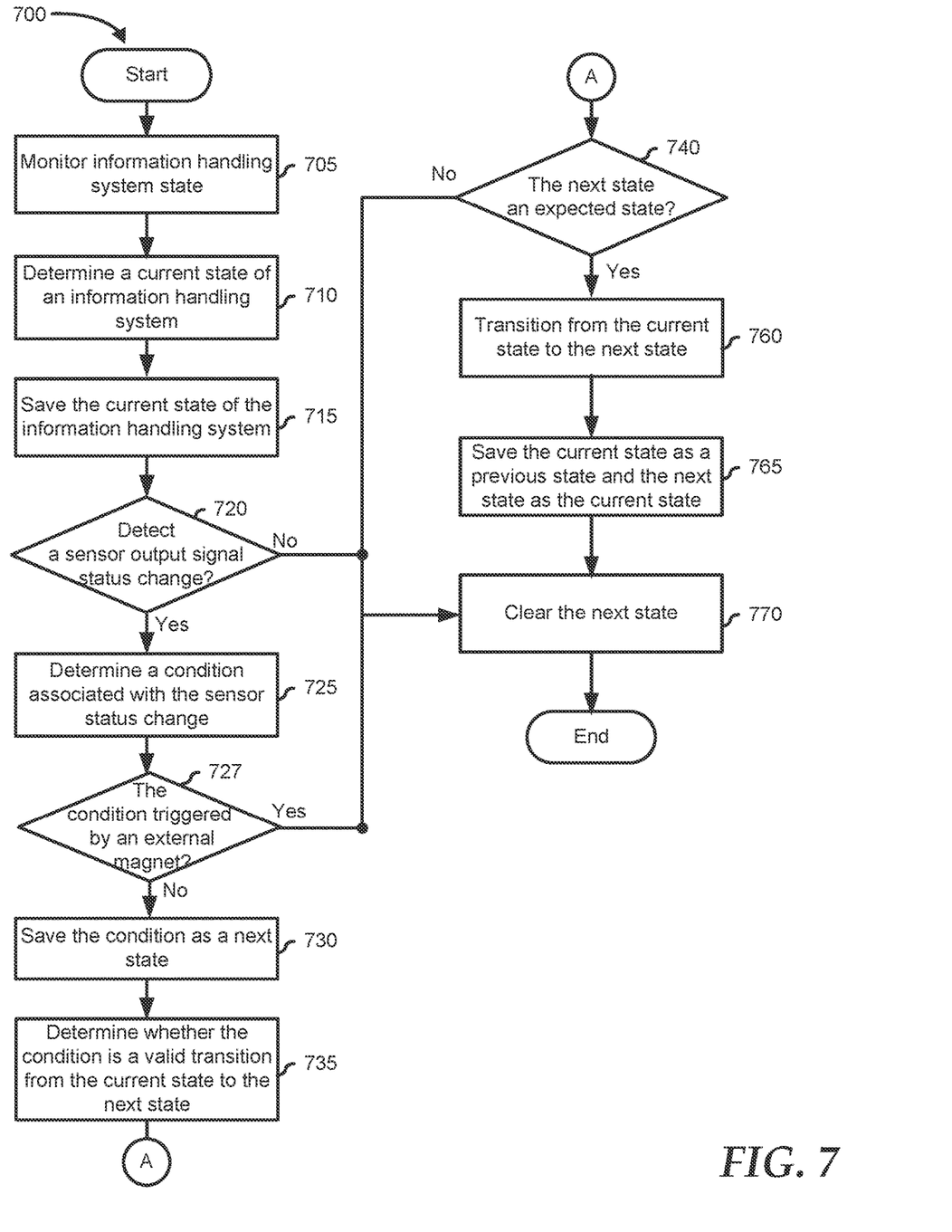
FIG. 7 is a flowchart of a method for dynamic remote power management of information handling systems via a universal serial bus port, according to an embodiment of the present disclosure.

FIG. 7 shows a flowchart of a method 700 for state machine-coupled sensor control. State diagram 500 defines a sequential state and order of state orientation that may ensure accurate mode transitions with temporal dependencies based on the current state and the previous state of the information handling system. Method 700 may be performed by one or more components of information handling system 200 of FIG. 2. In particular, method 700 may be performed by sensor hub 210 and/or state controller 225 of FIG. 2. However, while embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 700 typically starts at block 705 where a sensor hub, an embedded controller, and a state controller in particular monitor an information handling system for output signals from one or more sensors. The method may proceed to block 710, where the embedded controller and/or the state controller may determine the current state of the information handling system. For example, the embedded controller and/or the state controller may query the sensor hub for the current state of output signals of orientation sensor 215, lid position sensor 230, and mode sensor 235. The embedded controller and/or the state controller may also determine the hinge angle and/or the system mode.

The method may proceed to block 715 where the state controller may save the condition associated with the current state of the information handling system to a non-volatile memory. The method may proceed to decision block 720, where the state controller and/or the sensor hub may detect a sensor output signal status change. For example, the sensor hub and/or the state controller may receive an output signal from one or more sensors, wherein the received output signal is different from its current signal. For example, the output signal received may be high, whereas the current output signal is low or vice versa. The output signal may be received from or triggered by a GPIO pin, an I²C bus, or another communication bus. If the state controller and/or the sensor hub detect a sensor status change, then the "YES" branch is taken, and the method proceeds to block 725. If the state controller and/or the sensor hub do not detect a sensor status change, then the "NO" branch is taken, and the method proceeds to block 770.

At block 725, the state controller may determine a condition associated with the sensor status change. The condition may be one of eight conditions identified in table 300 of FIG. 3. For example, if the output signal of mode sensor changes from high to low, wherein the output signals of orientation sensor and the lid position sensors are unchanged at low, and wherein the current status of the information handling system is the condition, then the status change of the mode sensor may relate to the condition 1. Based on this scenario, an external magnet may have falsely triggered the status change in the output signal of the mode sensor.

The method may proceed to decision block 727, where the state controller may determine whether the condition may have been triggered by an external magnet, such as the conditions depicted in FIG. 4. For example, the condition may have been falsely triggered by the external magnet. If the condition is triggered by the external magnet, then the "YES" branch is taken and the method proceeds to block 770. If the condition is not triggered by the external magnet, then the "NO" branch is taken and the method proceeds to block 730.

At block 730 where the state controller may save the determined condition as the next state in a non-volatile memory or storage device. The method may proceed to block 735, where the state controller may determine whether the condition is a valid transition from the current state to the next state. The method may proceed to decision block 740 where the state controller may determine whether the detected sensor status change indicates an expected state or a valid condition that the current state can transition next to based on the current state and the previous state, such as by referring to table 600 of FIG. 6. If the detected sensor status change indicates the expected state or the valid condition, then the "YES" branch is taken, and the method proceeds to block 760. If the detected sensor status change does not indicate the expected state nor the valid condition, then the "NO" branch is taken, and the method proceeds to block 770.

At block 760, the state controller may transition from the current state to the next state, which is the expected state. The method proceeds to block 765 where the method may update the states saved in the non-volatile storage device, such as save the current state as a previous state and the next state as the current state. The method may proceed to block 770 where the state controller may clear the next state stored in the non-volatile memory or storage device. The information handling system may not transition from the current state to the next state if the next state is not the expected state. Accordingly, the information handling system may maintain or remain in its current state. After which the method may end. However, instead of ending, the method may proceed to block 705 where the method may continue monitoring the information handling system.

Although FIG. 7 show example blocks of method 700 in some implementation, method 700 may include additional blocks, fewer blocks, different blocks, or differently arranged blocks than those depicted in FIG. 7. Those skilled in the art will understand that the principles presented herein may be implemented in any suitably arranged processing system. Additionally, or alternatively, two or more of the blocks of method 700 may be performed in parallel. For example, block 765 and block 770 of method 700 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   determining, by a processor, a current state of an information handling system;
   receiving a sensor output signal from a sensor;
   in response to detecting a status change with the sensor output signal:
      determining whether the status change of the sensor output signal relates to an expected state based on the current state and a previous state of the information handling system; and
      determining whether the sensor output signal is triggered by an external magnet;
   when the status change of the sensor output signal relates to the expected state and the sensor output signal is not triggered by the external magnet and a time threshold is met, then transitioning the information handling system from the current state to the expected state; and
   when the status change of the sensor output signal does not relate to the expected state and the sensor output signal is triggered by the external magnet and the time threshold is not met, then maintaining the information handling system in the current state.

2. The method of claim 1, wherein the sensor is one of a lid position sensor, a mode sensor, or an orientation sensor.

3. The method of claim 1, further comprising when the current state is a lid closed mode and the expected state is a tablet mode, then determining whether the time threshold from the lid closed mode to the tablet mode is met.

4. The method of claim 3, further comprising when the time threshold is met, then transitioning to the tablet mode.

5. The method of claim 3, further comprising when the time threshold is not met, then waiting for a specified time prior to determining whether the time threshold from the lid closed mode to the tablet mode is met.

6. The method of claim 1, further comprising saving a first condition associated with the current state and a second condition associated with a next state in a non-volatile memory.

7. The method of claim 1, further comprising filtering an unexpected state of the information handling system.

8. An information handling system, comprising:
   a processor; and
   a memory device storing instructions that when executed causes the processor to perform operations including:
      determining a current state of the information handling system;
      receiving a sensor output signal from a sensor;
      in response to detecting a status change with the sensor output signal:
         determining whether the status change of the sensor output signal relates to an expected state based on the current state and a previous state of the information handling system;
         determining whether the sensor output signal is triggered by an external magnet;
      when the status change of the sensor output signal relates to the expected state and the sensor output signal is not triggered by the external magnet and a time threshold is met, then transitioning the information handling system from the current state to the expected state; and when the status change of the sensor output signal does not relate to the expected state and the sensor output signal is triggered by the external magnet and the time threshold is not met, then maintaining the information handling system in the current state.

9. The information handling system of claim 8, wherein the sensor is one of a lid position sensor, a mode sensor, or an orientation sensor.

10. The information handling system of claim 8, wherein the operations further comprise when the current state is a lid closed mode and the expected state is a tablet mode, then determining whether the time threshold from the lid closed mode to the tablet mode is met.

11. The information handling system of claim 10, wherein the operations further comprise when the time threshold is met, then transitioning to the tablet mode.

12. The information handling system of claim 10, wherein the operations further comprise when the time threshold is not met, then waiting for a specified time prior to determining whether the time threshold from the lid closed mode to the tablet mode is met.

13. The information handling system of claim 8, wherein the operations further comprise saving a first condition associated with the current state and a second condition associated with a next state in a non-volatile memory.

14. The information handling system of claim 8, wherein the operations further comprise filtering an unexpected state of the information handling system.

15. A non-transitory computer-readable medium to store instructions that are executable to perform operations comprising:
   determining a current state of an information handling system;
   receiving a sensor output signal from a sensor;
   in response to detecting a status change with the sensor output signal, determining whether the status change of the sensor output signal relates to an expected state based on the current state and a previous state of the information handling system, and determining whether the sensor output signal is triggered by an external magnet; and
   when the status change of the sensor output signal relates to the expected state and the sensor output signal is not triggered by the external magnet and a time threshold is met, then transitioning the information handling system from the current state to the expected state.

16. The non-transitory computer-readable medium of claim 15, wherein the sensor is one of a lid position sensor, a mode sensor, or an orientation sensor.

17. The non-transitory computer-readable medium of claim 15, wherein
   the operations further comprise when the current state is a lid closed mode and the expected state is a tablet mode, then determining whether the time threshold from the lid closed mode to the tablet mode is met.

18. The non-transitory computer-readable medium of claim 17, wherein the operations further comprise when the time threshold is met, then transitioning to the tablet mode.

19. The non-transitory computer-readable medium of claim 17, wherein the operations further comprise when the time threshold is not met, then waiting for a specified time prior to determining whether the time threshold from the lid closed mode to the tablet mode is met.

20. The non-transitory computer-readable medium of claim 15, wherein the operations further comprise saving a first condition associated with the current state and a second condition associated with a next state in a non-volatile memory.

* * * * *